United States Patent
Balland

[11] 3,853,460
[45] Dec. 10, 1974

[54] CONCENTRATED AND STABLE SALT COMPOSITIONS OF EPOXYPROPYLAMMONIUM SALTS

[75] Inventor: Jean Balland, Chateau-Renault, France

[73] Assignee: Manufacture De Produits Chemiques Protex, Paris, France

[22] Filed: Jan. 26, 1973

[21] Appl. No.: 326,586

[30] Foreign Application Priority Data
Jan. 26, 1972   France .............................. 72.03385

[52] U.S. Cl. .............................. 8/84, 8/188, 8/172, 8/169
[51] Int. Cl. .......................... C09b 6/70, D06p 1/68
[58] Field of Search .................................. 8/84, 188

[56] References Cited
UNITED STATES PATENTS
2,131,146   9/1938   Schlack .................................. 8/177
FOREIGN PATENTS OR APPLICATIONS
6,710,789   3/1968   Netherlands .............................. 8/94
2,061,533   6/1971   France .................................. 8/84

OTHER PUBLICATIONS
Symm, Tex. Chem & Col, Vol. 1, No. 6, p. 42, 1969.

*Primary Examiner*—Donald Levy
*Attorney, Agent, or Firm*—Browdy and Neimark

[57] ABSTRACT

Concentrated and stable salts of epoxypropyltrialkyl ammonium which are less sensitive to the action of atmospheric humidity, which salt crystallizes pure, and corresponding to the formula:

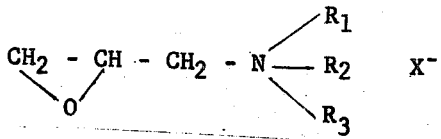

in which $R_1$, $R_2$ and $R_3$ are alkyl radicals having 1–3 carbon atoms, and X is an anionic group as halogen, sulfate, phosphate, characterized by the addition of usual organic solvents, and of alkaline alkyl sulfosuccinates or alkylsulfosuccinamates.

5 Claims, No Drawings

CONCENTRATED AND STABLE SALT COMPOSITIONS OF EPOXYPROPYLAMMONIUM SALTS

The present invention relates to the solubilization of products which are extremely important in the treatment of natural, artificial or synthetic textiles, and particularly in the operations of dyeing or printing. The products have the following general formula:

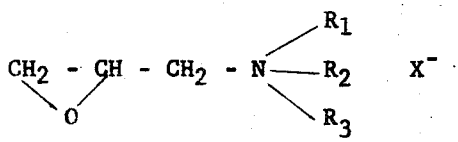

$R_1$, $R_2$, $R_3$ being lower alkyl radicals having preferably 1 – 3 carbon atoms and $X^-$ being an anionic group such as sulfate, phosphate, halogens, etc.

These known compounds, which are very soluble in water, unfortunately, cannot be used in aqueous solutions because of their tendency to hydrolyze in water.

It is therefore important to be able to use a different solvent which is inert with respect to these products. It is known, however, that the above epoxypropylammonium salts are insoluble in many organic solvents, such as hydrocarbons, chlorinated solvents, ketones, ethers, etc.

However, such salts are slightly soluble in certain organic solvents. In particular, it is known that the solubility, although quite limited, is sufficient to be useful with the following different classes of solvents:

1. The use a aprotic solvents, such as for example the products listed hereafter, permit dissolving of variable quantities of epoxypropylammonium salt:

Dimethylformamide (DMF) 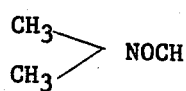

Dimethylsulfoxide (DMSO) 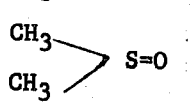

N-Methylpyrrolidone (NMP) 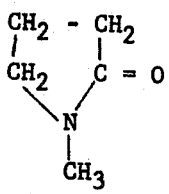

The solubility in these solvents is however limited. For example, the solubility of trimethylammonium 2-3 epoxypropyl chloride in DMF rises to the following amounts:

at 20°C. : 0.6 g. per 100 ml. DMF
at 60°C. : 4 g. per 100 ml. DMF

2. It is also known that the use of glycollic ethers, i.e. alkyl ethers of glycols such as those exemplified hereafter in a non-limitative manner, also permit the dissolving of variable but limited quantities of epoxypropyl ammonium salt. Such ethers include: cellosolves such as methyl cellosolve ($CH_3-O-CH_2-CH_2-OCH_2-CH_2OH$); ethyl-carbitol; butyl-carbitol; etc.

In the course of tests conducted relating to the use of epoxypropylammonium salts in the dyeing field, it was discovered, in an unexpected way, that the solubility of these salts can be distinctly increased by the use of certain additives.

More particularly, it has been found that the use of alkylsulfosuccinates and alkylsulfosuccinamates, such as those described below, result in a notable increase in the solubility of the salts of epoxypropylammonium in the different hydrosoluble solvents already defined. The following are examples of such additives:

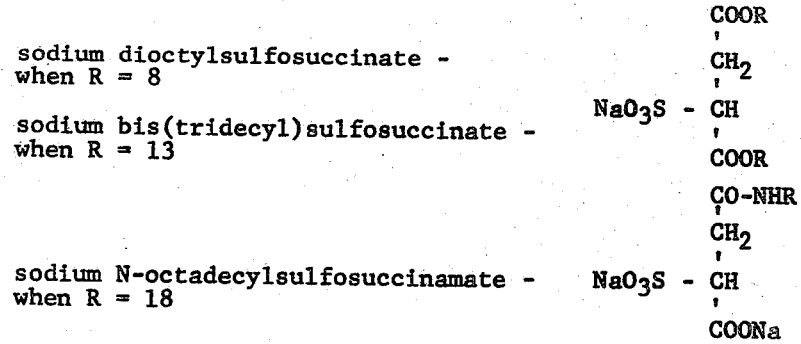

The specificity of the alkyl-sulfosuccinates and alkyl-sulfosuccinamates which permit the increase in the solubility of the epoxypropylammonium salts, for example in the solvents recited heretofore, constitute the essential feature of the present invention. This discovery has industrial importance since it makes possible the preparation and use of epoxypropylammonium salts in concentrated forms in various solvents.

The ability to increase the solubility of these salts in organic solvents, which would be impossible to predict, is actually specific to sulfosuccinic or sulfosuccinamic esters, because the study of this phenomenon has shown that the use of other compounds such as alkyl phenols, fatty alcohol sulfates, alkyl- and aryl alkyl-sulfonates, carboxylic acids, phosphoric acid esters, condensates of fatty alcohols, etc. do not result in the increase in the solubility of the epoxypropylammonium salts in the different organic solvents.

The known salts of formula I are prepared in a known manner by the action of an excess of epihalohydrin on a tertiary amine in the presence or not of a third solvent which is inert under the working conditions. The process is characterized in that the solvent has a boiling point higher than that of the epihalohydrin or resulting in a minimum azeotrope with it and that the excess epihalohydrin is removed by distillation or entrainment under vacuum at a low temperature leaving in the product the quantity of solvent necessary to obtain the desired characteristics. Thus, it is possible to obtain products having a concentration of the epoxypropylammonium salt up to 400% with respect to the quantity of solvent present and being in the form of stable pastes of high viscosity.

The improvement in solubility of the epoxypropylammonium salts in different solvents not only permits the use of these salts in a solvent medium but offers the further advantage of reducing the hygroscopicity of these salts. It is indeed known that these salts possess a great hygroscopicity leading, for example, to a certain degree of hydrolysis of the salts. The use of these salts in a determined solvent thus reduces hydrolysis of the salts and constitutes a distinct improvement in this regard.

The control of the stability of the salts in the presence of solvents shows that these products do not undergo any change due to the presence of solvent; likewise when they are brought to and maintained at the temperature of 60°C. for several hours no change occurs.

The presence of solvents and of alkyl-sulfosuccinates or alkyl-sulfosuccinamates in dyeing applications has no influence on the properties of the epoxypropylammonium salts. It has been found that the use of these novel mixtures, for example in dyeing formulas such as those given hereafter at the concentration indicated, gives no difference in the results obtained by the use of an identical product in the absence of these solvents and products.

1. Dye Solution in Reactive Dyeing by the Pad-Therm Process

A dyeing bath is prepared in the following manner:

40 g/l dye (Reactive blue 14)
100 g/l urea
20 g/l sodium carbonate
40 g/l composition according to the invention.

The composition according to the invention comprising the epoxypropylammonium salt, the chosen solvent and the alkylsulfosuccinate or the alkylsulfosuccinamate.

After impregnation of the foulard, the material is dried for 2 minutes at 100°C. then fixed for 4 minutes at 150°C.; then it is washed in the following manner:
cold water
hot water
washing in soap 5 minutes at boiling point.

2. Dyeing Solution in Reactive Dyeing According to the Pad-Batch Process

The dyeing bath is prepared in the following manner:

40 g/l dye (Reactive red 4)
100 g/l urea
12 g/l caustic soda
40 g/l composition according to the invention.

After impregnation of the foulard, the material is rolled up; then maintained at ambient temperature for 12 hours; then it is washed in the following manner:
cold water
hot water
soap washed 5 minutes at the boiling point.

3. Dyeing Solution in Direct Dyeing by the Pad-Therm Process.

The bath is prepared as follows:

40 g/l dye (Direct blue 78)
100 g/l urea
20 g/l sodium carbonate
40 g/l composition according to the invention.

After impregnation of the foulard, the material is dried 2 minutes at 100°C. then fixed 4 minutes at 150°C.; it is then washed in the following manner:
cold water
hot water
soap washed 5 minutes at the boiling point.

It should be noted that in these three dyeing examples, the results recorded are identical to those obtained by the use of an equivalent quantity of epoxypropylammonium salt in the absence of all solvent.

Far from negatively influencing the color yields, the use of the novel solution preparations on the contrary offer a certain advantage. The hydrotropic properties possessed by the epoxypropylammonium salts are known, especially permitting moving back the threshold of solubility of numerous dyeing materials. The presence of solvents, particularly the aprotic solvents, increases the power of solubilization with respect to dyes, permitting further increasing of the limits of solubility of the different dyes.

The following examples further define in an indicative and non-limiting manner, the possibilities for accomplishing the invention.

EXAMPLE 1

Preparation of a Paste of Trimethyl-2-3 Epoxypropyl Ammonium Chloride in 2-Ethoxyethanol.

At less than 30°C., 59 g. of trimethylamine are injected into 195 g. of epichlorhydrin and the mixture is maintained at this temperature until there is obtained a paste containing no more than traces of free trimethylamine.

The product is then diluted with 700 g. of 2-ethoxyethanol, mixed with 8 g. of sodium dioctylsulfosuccinate and the mixture is distilled under high vacuum to yield 210 g. of residual product, the final temperature of distillation not exceeding 70°C.

The product obtained is a stable paste of 75% epoxypropylammonium chloride in 2-ethoxyethanol containing less than 0.1% of free epichlorhydrin.

The solubilization of trimethyl 2-3 epoxypropyl ammonium chloride takes place in dimethylformamide in the presence of sodium dioctylsulfosuccinate; for this, first of all, the sodium dioctylsulfosuccinate is added in the proportion of 10 parts of the latter to 100 parts of DMF, then the required quantity of the crystallized epoxy ammonium salt is next added without agitation.

By way of example, the use of the following proportions of concentration permit the dissolving of the indicated quantities of trimethyl epoxypropyl ammonium chloride:
at 20°C. : 25 g/100 g. of DMF
at 60°C. : 60 g/100 g. of DMF

EXAMPLE 2

The Use of Sodium Bis(Tridecyl) Sulfosuccinate

The use of this compound, under identical conditions to those of Example 1, provides the following solubility results:
at 20°C. : 20 g/100 g. of DMF
at 60°C. : 85 g/100 g. of DMF

EXAMPLE 3

The Use of Sodium N-Octadecylsulfosuccinamate.

The use of this compound under conditions identical to the preceding examples yield the following results:

at 20° C. : 15 g/100 g. of DMF
at 60° C. : 60 g/100 g. of DMF

EXAMPLE 4

Solubilization of Trimethyl 2-3

Epoxypropylammonium Chloride in DMSO in the presence of Sodiumdioctylsulfosuccinate.

Operating under the same conditions as in Example 1, the solubility of this salt is greater than in DMF.

At 20°C. the solubility is of the order of 50%. This solubility is increased enormously by the raising of the temperature to such a point that it becomes possible to introduce variable quantities of the epoxypropylammonium salt to be able to extend up to 400% with respect to the quantity of solvent used.

At high concentration, it was discovered that an important thickening occurs upon cooling, providing when cold a perfectly homogeneous paste.

EXAMPLE 5

Solubilization of Trimethyl 2-3 Epoxypropylammonium Chloride in Methyl-Cellosolve in the Presence of Sodium Dioctylsulfosuccinate.

Under identical operating conditions to those of Example 1, the solubility of the salt is particularly elevated in this case up to the order of 120% with respect to the solvent.

As in Example 3, it is possible to introduce large quantities of salt at 60°C. and to obtain thereby in the course of cooling a relatively thick paste which is perfectly homogeneous and stable.

It is to be understood that the invention is not limited to the embodiments disclosed which are illustratively offered and that modifications may be made without departing from the invention.

What is claimed is:

1. A stable paste consisting essentially of
   a stabilized salt of epoxypropyltrialkyl ammonium compound which is less sensitive to the action of atmospheric humidity, which salt crystallizes pure and corresponding to the formula

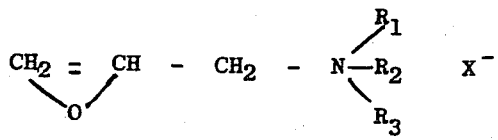

in which $R_1$, $R_2$ and $R_3$ are each an alkyl of 1–3 carbons, and X is an anionic group,
an organic solvent for said salt selected from the group consisting of aprotic organic solvents or alkyl ethers of glycols, and
an alkaline alkyl sulfosuccinate or alkylsulfosuccinamate.

2. A composition according to claim 1 wherein the said organic solvent is selected from the group consisting of dimethylformamide, dimethylsulfoxide, N-methylpyrolidone, and the glycol alkyl ethers and X is halogen, phosphate or sulfate.

3. A composition according to claim 2 wherein said alkaline alkylsulfosuccinates have the formula:

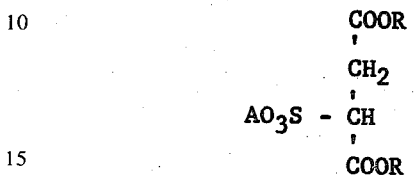

and said alkaline alkylsulfosuccinamates have the formula:

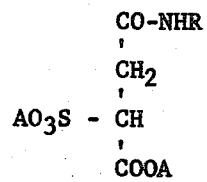

wherein R is alkyl and A is an alkali metal.

4. A composition according to claim 3 wherein R is an alkyl of 8 – 18 carbon atoms.

5. In a process for dissolving a salt of epoxypropyltrialkyl ammonium in an organic solvent for said salt, said salt having the formula

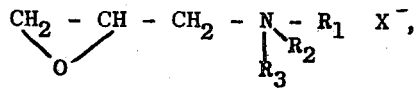

the improvement comprising
improving the solubility of said salt in said solvent by adding thereto an alkaline alkyl sulfosuccinate or alkaline alkyl sulfosuccinamate.

* * * * *